(12) United States Patent
Taki

(10) Patent No.: US 8,090,391 B2
(45) Date of Patent: Jan. 3, 2012

(54) WIRELESS COMMUNICATION BASE STATION DEVICE CONFIGURED TO USE PLURAL COMMUNICATION SCHEMES, AND WIRELESS COMMUNICATION SYSTEM

(75) Inventor: Daisuke Taki, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1233 days.

(21) Appl. No.: 11/687,863

(22) Filed: Mar. 19, 2007

(65) Prior Publication Data

US 2007/0223417 A1 Sep. 27, 2007

(30) Foreign Application Priority Data

Mar. 22, 2006 (JP) ................................. 2006-079240

(51) Int. Cl.
*H04Q 7/20* (2006.01)
(52) U.S. Cl. ........................................ 455/464; 370/329
(58) Field of Classification Search .................... 455/464
See application file for complete search history.

(56) References Cited

U.S. PATENT DOCUMENTS

| | | | | |
|---|---|---|---|---|
| 2003/0087662 A1* | 5/2003 | Miyoshi et al. | ............... | 455/522 |
| 2005/0208956 A1* | 9/2005 | Takagi et al. | ................ | 455/464 |
| 2005/0270969 A1* | 12/2005 | Han et al. | ...................... | 370/210 |
| 2006/0013184 A1 | 1/2006 | Utsunomiya et al. | | |
| 2007/0014258 A1* | 1/2007 | Tanaka | ...................... | 370/329 |
| 2009/0285116 A1* | 11/2009 | Nanda et al. | ................. | 370/252 |

FOREIGN PATENT DOCUMENTS

| JP | 11-215171 | 8/1999 |
|---|---|---|
| JP | 2003-152727 | 5/2003 |
| JP | 2005-94519 | 4/2005 |
| JP | 2005-341297 | 12/2005 |
| JP | 2006-5672 | 1/2006 |
| JP | 2007-81836 | 3/2007 |
| JP | 2008-502266 | 1/2008 |

OTHER PUBLICATIONS

"IEEE Standards for Information Technology—Telecommunications and Information Exchange between Systems—Local and Metropolitan Area Network—Specific Requirements—Part 11: Wireless LAN Medium Acess Control (MAC) and Physical Layer (PHY) Specifications", IEEE 802.11, 1999 Edition (ISO/ IEC 8802-11), 10 pages.

Adrian Stephens, et al., "Joint Proposal: High throughput extension to the 802.11 Standard: MAC", IEEE P802.11-05/1095r5, Jan. 2006, 5 pages.

Office Action issued Mar. 1, 2011 in Japan Application No. 2006-079240 (With English Translation).

Office Action issued Jul. 12, 2011, in Japanese Patent Application No. 2006-079240 (with English-language translation).

* cited by examiner

*Primary Examiner* — Dwayne Bost
*Assistant Examiner* — Joseph Dean, Jr.
(74) *Attorney, Agent, or Firm* — Oblon, Spivak, McClelland, Maier & Neustadt, L.L.P.

(57) ABSTRACT

A wireless communication base station device includes a measuring section and a communication period determining section. The device is configured to use a first wireless communication scheme and a second wireless communication scheme which use overlapping bands. The measuring section measures a first transmission and reception time spent on actual data transmission and reception during a first communication-enabled period in which data communication based on the first wireless communication scheme is permitted, and measures a second transmission and reception time spent on actual data transmission and reception during a second communication-enabled period in which data communication based on the second wireless communication scheme is permitted. The communication period determining section determines lengths of the first and second communication-enabled periods in accordance with the first and second transmission and reception times measured by the measuring section.

10 Claims, 11 Drawing Sheets

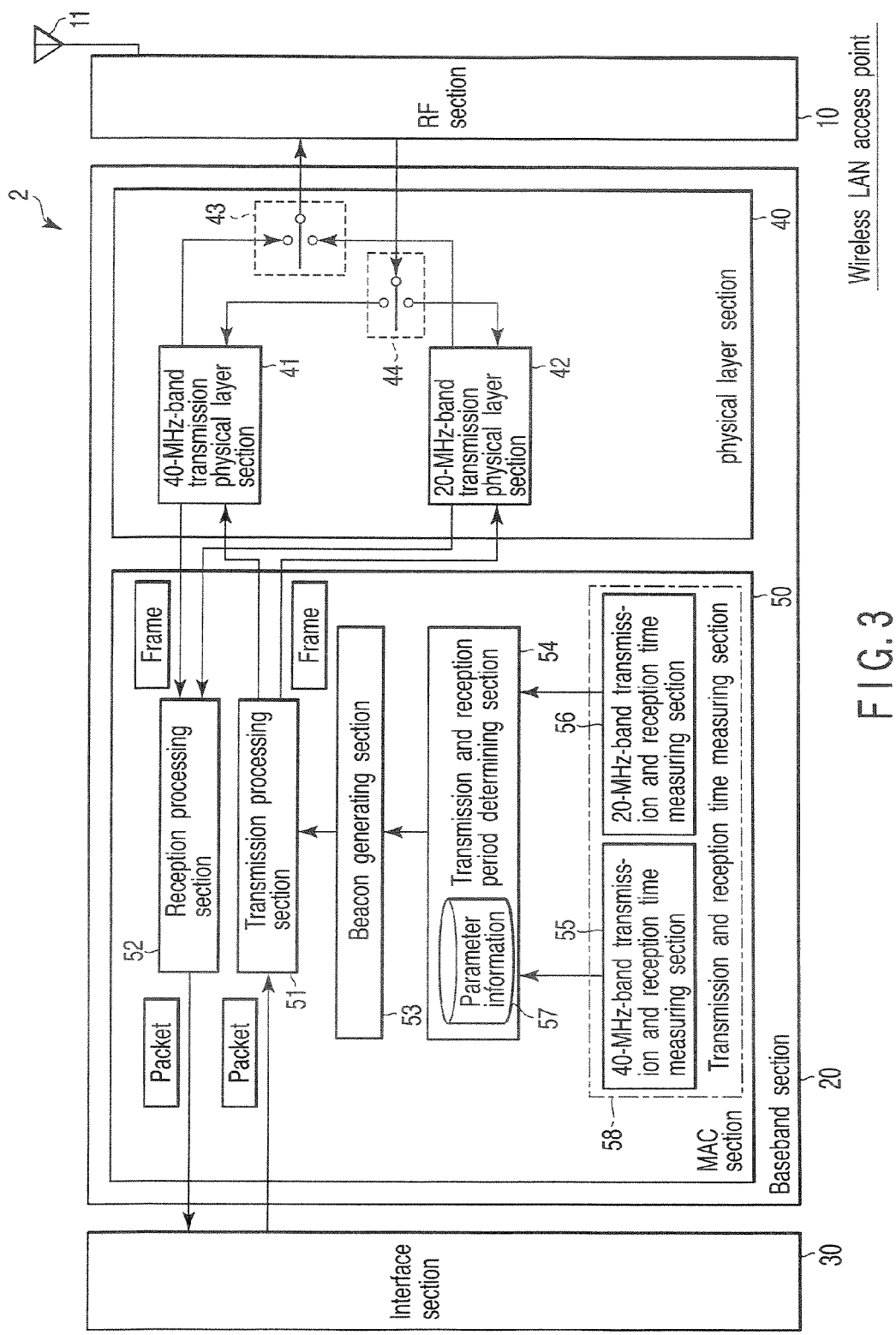
F I G. 3

| Parameter | Set value |
|---|---|
| Maximum 40-MHz transmission period | 95% of communication period |
| Minimum 40-MHz transmission period | 5% of communication period |
| Period increase threshold | 80% of transmission enabled period |
| Period increase rate | 120% of transmission enabled period |

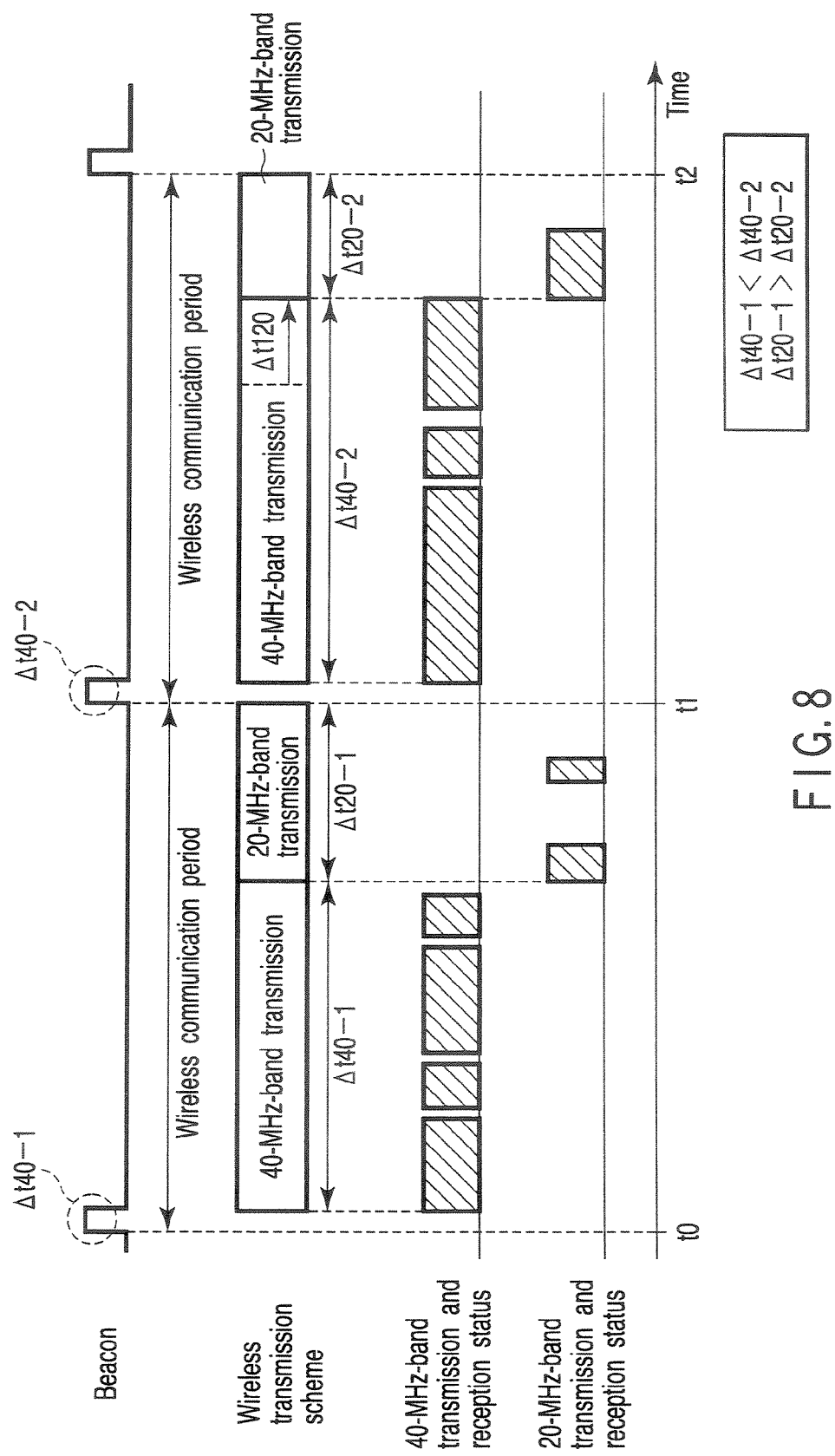
F I G. 8

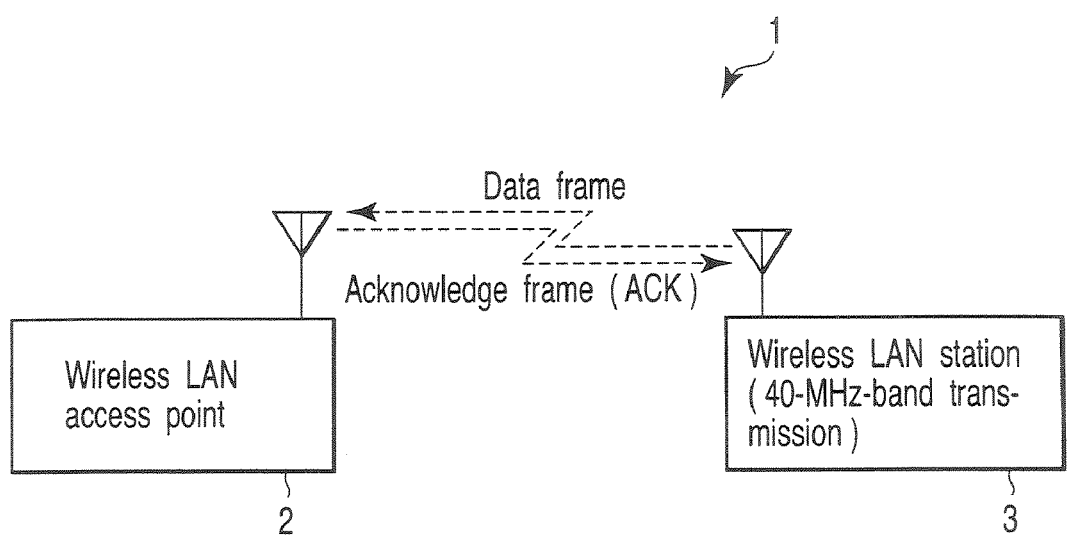
F I G. 10

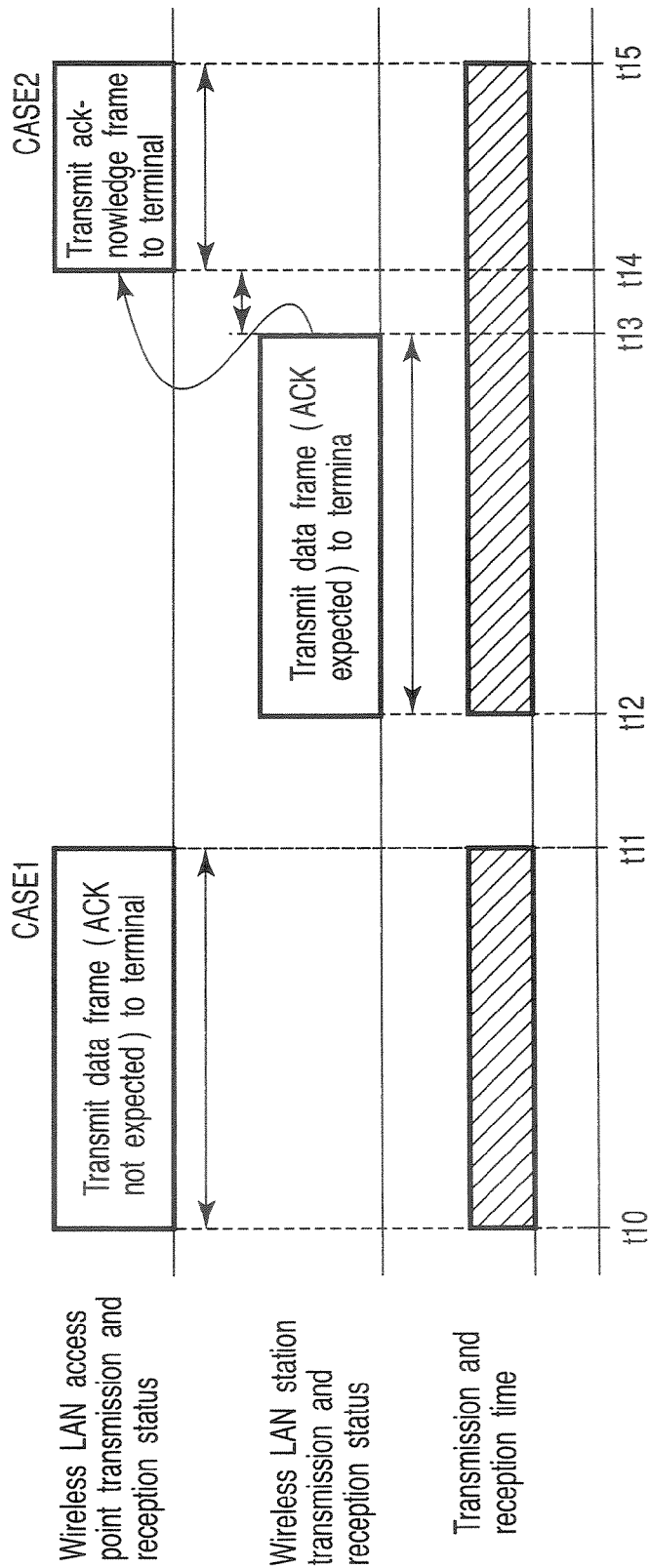
F I G. 11

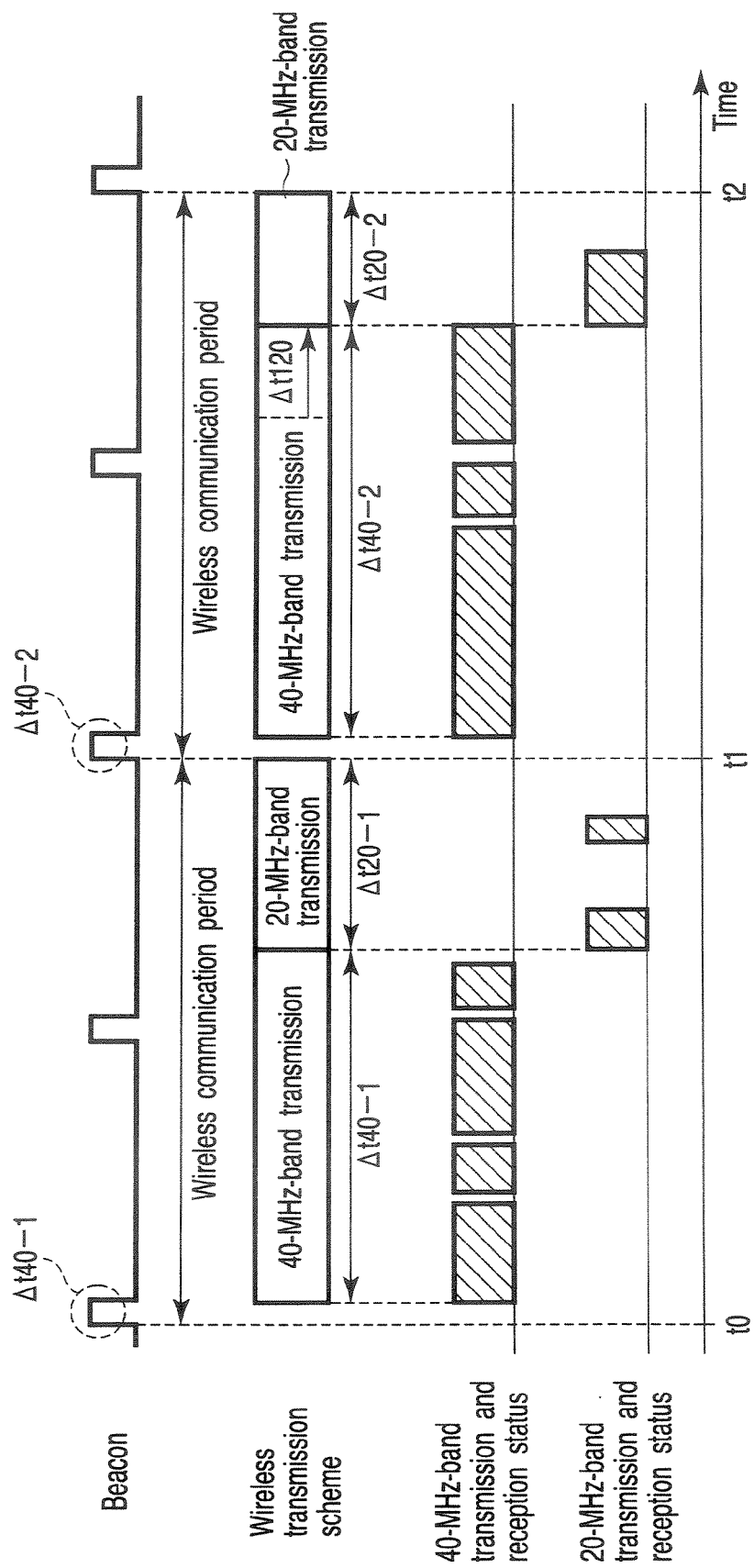
F I G. 12

WIRELESS COMMUNICATION BASE STATION DEVICE CONFIGURED TO USE PLURAL COMMUNICATION SCHEMES, AND WIRELESS COMMUNICATION SYSTEM

CROSS-REFERENCE TO RELATED APPLICATIONS

This application is based upon and claims the benefit of priority from prior Japanese Patent Application No. 2006-079240, filed Mar. 22, 2006, the entire contents of which are incorporated herein by reference.

BACKGROUND OF THE INVENTION

1. Field of the Invention

The present invention relates to wireless communication base station devices and wireless communication systems. For example, the present invention relates to a wireless LAN base station device configured to use a plurality of communication schemes.

2. Description of the Related Art

In recent years, the Institute of Electrical and Electronics Engineers (IEEE) 802.11 committee has discussed next-generation high-speed wireless local area network (LAN) schemes. The committee has proposed a scheme of increasing a communication frequency band from 20 MHz, a conventional value, to 40 MHz to enable high-speed communications. This proposal is documented in "IEEE Standards and Information Exchange between Systems—Local and Metropolitan Area Network—Specific Requirements—Part 11: Wireless LAN Medium Access Control (MAC) and Physical Layer (PHY) Specifications", IEEE 802.11, 1999 Edition (ISO/IEC 8802-11), 1999, and on the Internet <URL://standards.ieee.org/getieee802/802.11.html> and <URL://standards.ieee.org/getieee802/download/802.11-1999.pdf>.

The committee has also proposed a communication scheme called 20-MHz-Base Managed Mixed Mode according to which both a wireless LAN terminal for communications in a 40-MHz band and a wireless LAN terminal for communications in a 20-MHz band are accommodated in one wireless LAN base station. This scheme is documented in Adrian Stephens & Sean Coffey, "Joint Proposal: High throughput extension to the 802.11 Standard: MAC", IEEE 802.11-05-1095-05, 2006, January and on the Internet <URL://www.802wirelessworld.com>. According to this scheme, a wireless LAN base station determines communication periods at 20 MHz and 40 MHz within one data communication cycle.

However, traffic for actual transmissions may be incompatible with the communication periods depending on the assignment of communication periods within one cycle. This disadvantageously reduces the efficiency of data transmission.

BRIEF SUMMARY OF THE INVENTION

A wireless communication base station device configured to use a first wireless communication scheme and a second wireless communication scheme which use overlapping bands according to an aspect of the present invention includes:

a measuring section which measures a first transmission and reception time spent on actual data transmission and reception during a first communication-enabled period in which data communication based on the first wireless communication scheme is permitted, and measures a second transmission and reception time spent on actual data transmission and reception during a second communication-enabled period in which data communication based on the second wireless communication scheme is permitted; and a communication period determining section which determines lengths of the first and second communication-enabled periods in accordance with the first and second transmission and reception times measured by the measuring section.

A wireless communication system according to an aspect of the present invention includes:

a wireless communication base station device configured to use a first wireless communication scheme and a second wireless communication scheme which use overlapping bands, the wireless communication base station device including:

a measuring section which measures a first transmission and reception time spent on actual data transmission and reception during a first communication-enabled period in which data communication based on the first wireless communication scheme is permitted, and measures a second transmission and reception time spent on actual data transmission and reception during a second communication-enabled period in which data communication based on the second wireless communication scheme is permitted;

a communication period determining section which determines lengths of the first and second communication-enabled periods in accordance with the first and second transmission and reception times measured by the measuring section;

a beacon generating section which generates a beacon provided with the first communication-enabled period determined by the communication period determining section; and a transmission section configured to create a beacon frame on the basis of the beacon and to transmit the beacon frame;

a plurality of first wireless communication terminals which use the first wireless communication scheme to transmit and receive data to and from the wireless communication base station device; and a plurality of second wireless communication terminals which use the second wireless communication scheme to transmit and receive data to and from the wireless communication base station device.

BRIEF DESCRIPTION OF THE SEVERAL VIEWS OF THE DRAWING

FIG. 3 is a block diagram of the wireless LAN base station in accordance with the first embodiment of the present invention;

FIG. 8 is a timing chart for beacon frames, available communication schemes, the status of transmission and reception in a 40-MHz band, and the status of transmission and reception in a 20-MHz band in a wireless communication system in accordance with the first embodiment of the present invention;

FIG. 10 is a block diagram of a wireless communication system in accordance with a second embodiment of the present invention;

FIG. 11 is a timing chart showing the transmission and reception status of a wireless LAN base station, the transmission and reception status of a wireless LAN terminal, and the time measured by a measuring section, in the wireless communication system in accordance with a second embodiment of the present invention;

FIG. 12 is a timing chart for beacon frames, available communication schemes, the status of transmission and reception in the 40-MHz band, and the status of transmission and reception in the 20-MHz band in a wireless communication system in accordance with a third embodiment of the present invention.

DETAILED DESCRIPTION OF THE INVENTION

First Embodiment

Figure 1:
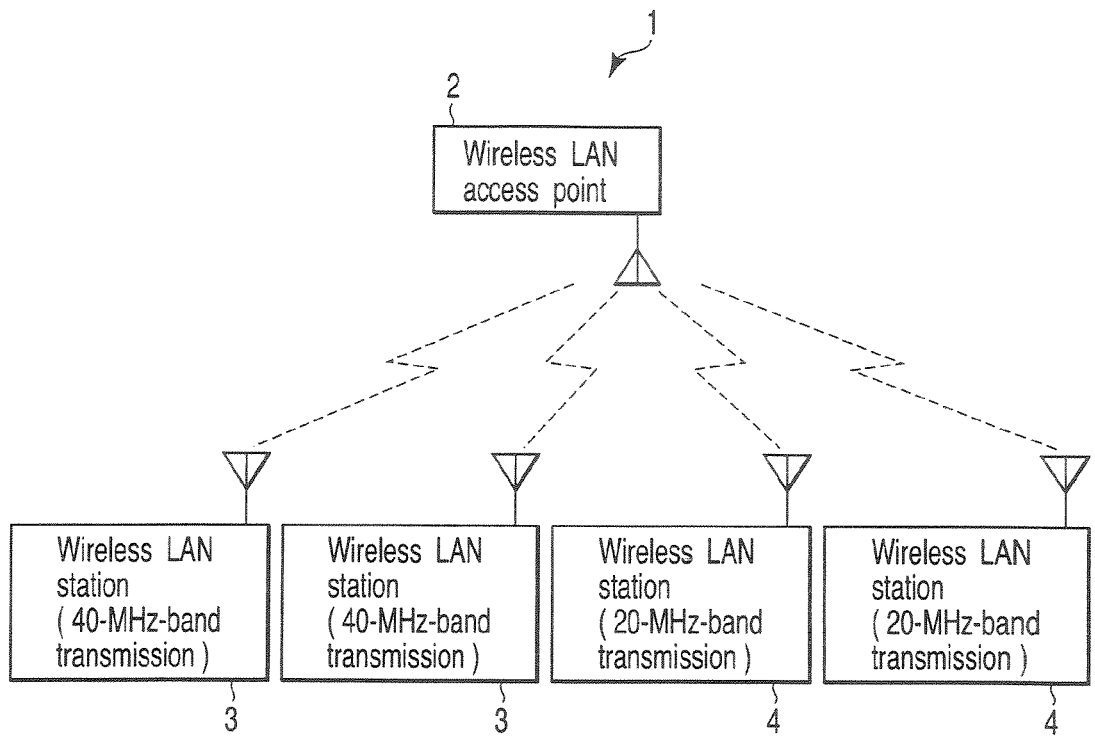
FIG. 1 is a block diagram of a wireless communication system in accordance with a first embodiment of the present invention.

With reference to FIG. 1, description will be given of a wireless communication base station device and a wireless communication system in accordance with a first embodiment of the present invention. FIG. 1 is a block diagram of a wireless communication system in accordance with the present invention.

As shown in FIG. 1, a wireless communication system 1 includes a wireless LAN base station 2 (which will be referred to as a wireless LAN access point 2, hereinafter) and a plurality of wireless LAN terminals 3 and 4 (which will be referred to as a wireless LAN stations 3 and 4, hereinafter), and these form a communication network (LAN). The wireless LAN station 3 uses a 40-MHz frequency band to communicate wirelessly with the wireless LAN access point 2 (this is sometimes referred to as a first communication scheme). The wireless LAN station 4 uses a 20-MHz frequency band to communicate wirelessly with the wireless LAN access point 2 (this is sometimes referred to as a second communication scheme). The wireless LAN access point 2 accommodates the wireless LAN stations 3 and 4. The wireless LAN access point 2 sets a 40-MHz-band transmission-enabled period (sometimes referred to as a transmission-enabled period based on the first communication scheme) during which communication using the 40-MHz frequency band is permitted and a 20-MHz-band transmission-enabled period (sometimes referred to as a transmission-enabled period based on the second communication scheme) during which communication using the 20-MHz frequency band is permitted. During the 40-MHz-band transmission-enabled period, the wireless LAN station 3 is enabled to communicate, while the wireless LAN station 4 is inhibited to communicate. On the other hand, during the 20-MHz-band transmission-enabled period, the wireless LAN station 4 is enabled to communicate, while the wireless LAN station 3 is inhibited to communicate. The wireless LAN access point 2 is connected to a server (not shown) by, for example, a wireless LAN or to the Internet via an Internet service provider by a metal line, an optical fiber, or the like.

Figure 2:
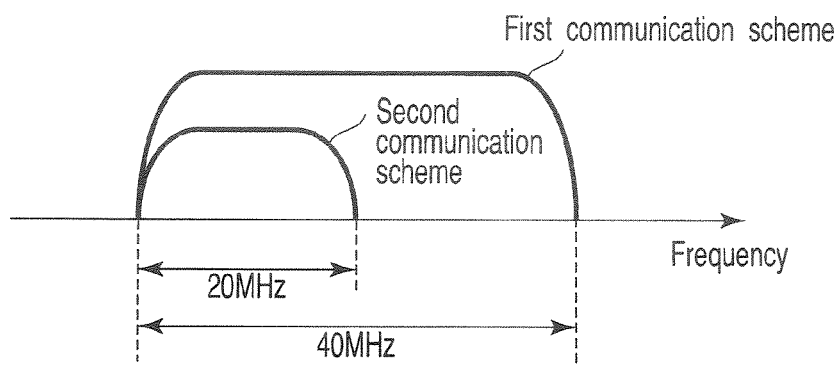
FIG. 2 is a band diagram showing frequency bands used by a wireless LAN terminal in accordance with the first embodiment of the present invention.

The above configuration provides a network in which the one wireless LAN access point 2 can simultaneously use the first and second communication schemes. With reference to FIG. 2, description will be given of the frequency bands used by the wireless LAN stations 3 and 4. FIG. 2 is a band diagram showing the frequency bands used by the wireless LAN stations 3 and 4. As shown in the figure, the frequency bands used by the wireless LAN stations 3 and 4 overlap.

Now, the configuration of the wireless LAN access point 2 will be described with reference to FIG. 3. FIG. 3 is a block diagram of the wireless LAN access point 2 in accordance with the present embodiment. As shown in the figure, the wireless LAN access point 2 generally includes a radio-frequency (RF) section 10, a baseband section 20, and an interface section 30. The RF section 10 performs, for example, amplification of data in analog signals transmitted and received by wireless communication and transmits and receives data by an antenna 11. The interface section 30 receives data (hereinafter referred to as transmission data) which is downloaded from the server or the Internet and which is to be transmitted to the wireless LAN stations 3 and 4. The interface section 30 also transmits data (hereinafter referred to as reception data) received from the wireless LAN stations 3 and 4 to the server or the Internet. The baseband section 20 executes signal processing on transmission data received by the interface section 30 and outputs the resulting data to the RF section 10. The baseband section 20 also executes signal processing on reception data received by the interface section 30 and outputs the resulting data to the interface section 30. The baseband section 20 will be described below in detail.

As shown in FIG. 3, the baseband section 20 includes a physical layer section 40 and a media access control (MAC) section 50. Transmission and reception data on the side of the wireless LAN stations 3 and 4 relative to the MAC section 50 are called "frames". Transmission and reception data on the side of the interface section 30 relative to the MAC section 50 are called "packets". The packet is transmission or reception data assembled into a data structure that can be handled by a personal computer or the like. The frame is transmission or reception data assembled so as to be wirelessly communicated. For the transmission and reception data, frames for net data are called data frames.

First, the configuration of the MAC section 50 will be described. The MAC section 50 includes a transmission processing section 51, a reception processing section 52, a beacon generating section 53, a transmission and reception period determining section 54, and a transmission and reception time measuring section 58.

Figures 4, 5:
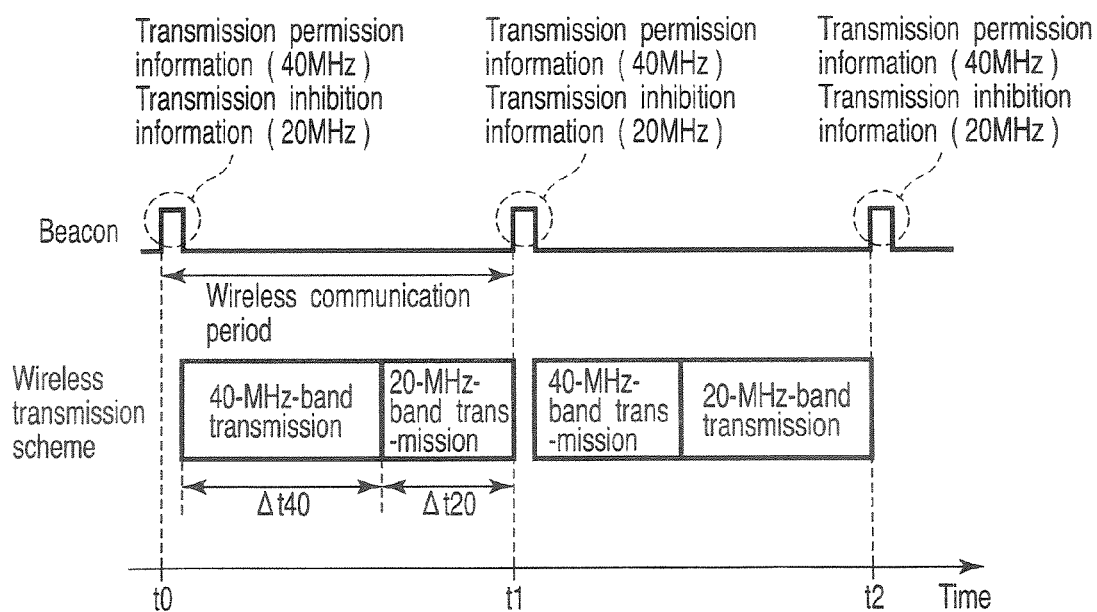
FIG. 4 is a table showing the contents of parameter information provided in the wireless LAN base station in accordance with the first embodiment of the present invention.
FIG. 5 is a timing chart for beacon frames and available communication schemes in a wireless communication system in accordance with the first embodiment of the present invention.

The transmission processing section 51 receives packets from the interface section 30. The transmission processing section 51 applies an MAC header to the packet to assemble a frame, and outputs the frame to the physical layer section 40. The reception processing section 52 receives the frame from the physical layer section 40. The reception processing section 52 removes the MAC header from the frame to assemble a packet, and outputs the packet to the interface section 30. The transmission and reception time measuring section 58 includes a 40-MHz-band transmission and reception time measuring section 55 and a 20-MHz-band transmission and reception time measuring section 56. The 40-MHz-band transmission and reception time measuring section 55 accumulates the time required to actually transmit and receive a frame during the 40-MHz-band transmission-enabled period. That is, the 40-MHz-band transmission and reception time measuring section 55 measures the time required for transmission and reception based on the first communication scheme. The 20-MHz-band transmission and reception time measuring section 56 accumulates the time required to actually transmit and receive a frame during the 20-MHz-band transmission-enabled period. That is, the 20-MHz-band transmission and reception time measuring section 55 measures the time required for transmission and reception based on the second communication scheme. The transmission and reception period determining section 54 determines the lengths of the 40-MHz-band transmission-enabled period and the 20-MHz-band transmission-enabled period on the basis of measurements made by the measuring sections 55 and 56. To make this determination, the transmission and reception period determining section 54 holds parameter information 57. FIG. 4 shows an example of the parameter information 57. FIG. 4 is a table showing parameters contained in the parameter information 57. As shown in the figure, the parameters in the parameter information 57 include a maximum 40-MHz transmission period, a minimum 40-MHz transmission period, a period increase threshold, and a period increase rate. The meanings of these parameters will be described below. The beacon generating section 53 generates a beacon signal on the basis of the length of each transmission period determined by the transmission and reception period determining section 54. The beacon is assembled into a beacon frame by the transmission processing section 51. The beacon frame is then output to the physical layer section 40.

With reference to FIG. 5, description will be given of concepts of the beacon, the 40-MHz-band transmission-enabled period, the 20-MHz-band transmission-enabled period, and the above parameters. FIG. 5 is a timing chart for beacon frames and communication schemes that can be used in the system 1. A beacon frame is output from the antenna 11 of the wireless LAN access point 2 at every fixed period. The period from one beacon to the next beacon frame corresponds to one cycle of a wireless communication period. Communications within the system 1 synchronize with beacon frames.

During one cycle of a wireless communication period, the wireless LAN access point 2 first sets a transmission-enabled period Δt40 based on the first communication scheme (40 MHz) and then a transmission-enabled period Δt20 based on the second communication scheme (20 MHz). As previously described, the lengths of the transmission-enabled periods Δt40 and Δt20 are determined by the transmission and reception period determining section 54. Specifically, the transmission and reception period determining section 54 determines the length of the period Δt40 and transmits it to the beacon generating section 53. The beacon generating section 53 outputs, to the transmission processing section 51, a beacon signal with information (hereinafter referred to as transmission permission information) indicating that transmission based on the first communication scheme is permitted during the period Δt40 and information (hereinafter referred to as a transmission inhibition information) indicating that transmission based on the second communication scheme is inhibited during that period. The transmission processing section 51 generates a beacon frame on the basis of the beacon signal.

The wireless LAN station 3, which communicates in accordance with the first communication scheme, communicates during the period Δt40 on the basis of the transmission permission information contained in the beacon frame. The wireless LAN station 4 does not communicate during the period Δt40 on the basis of the transmission inhibition information and communicates during the subsequent period Δt20.

The wireless communication period starting at a time t0 ends at a time t1, when the next beacon is generated to start the next wireless communication period. At this time, the transmission and reception period determining section 54 newly sets the periods Δ40 and Δt20 on the basis of the transmission and reception time during the preceding wireless communication period.

In the above description, the "maximum 40-MHz transmission period" in the parameter information 57 refers to the maximum value of the period Δt40 within one cycle of a wireless communication period. The "minimum 40-MHz transmission period" refers to the minimum value of the period Δt40 within one cycle of a wireless communication period. A "period increase threshold" refers to a threshold for the transmission and reception time on the basis of which the transmission and reception period is changed. A "period increase rate" refers to an increase rate at which the transmission and reception period is increased. Description will be given below of how the transmission and reception period determining section 54 uses these parameters.

Now, the configuration of the physical layer section 40 in FIG. 3 will be described. The physical layer section 40 includes a 40-MHz-band transmission physical layer section 41, a 20-MHz-band transmission physical layer section 42, a transmission switch 43, and a reception switch 44. The physical layer sections 41 and 42 execute transmitting and receiving processes on frames transmitted on the basis of the first and second communication schemes, the processes relating to a physical layer. Specifically, the physical layer sections 41 and 42 execute the following process. For a transmission frame, the physical layer sections 41 and 42 converts a frame provided by the transmission processing section 51 of the MAC section 50 into a redundant code and executes orthogonal frequency division multiplexing (OFDM) on the code to obtain a baseband transmission signal. Further, the sections 41 and 42 execute a D/A conversion on the baseband transmission signal to obtain the analog signal. For a reception frame, the physical layer sections 41 and 42 execute the reverse process. That is, the physical layer sections 41 and 42 digitize a received analog signal and then execute OFDM demodulation and error correction demodulation on the resulting data to obtain a frame.

The transmission switch 43 connects the 40-MHz-band transmission physical layer section 41 and the RF section 10 together for a 40-MHz-band transmission-enabled period. The transmission switch 43 connects the 20-MHz-band transmission physical layer section 42 and the RF section 10 together for a 20-MHz-band transmission-enabled period. This allows a transmission frame to be transmitted from the physical layer sections 41 and 42 to the RF section 10.

The reception switch 44 connects the 40-MHz-band transmission physical layer section 41 and the RF section 10 together for a 40-MHz-band transmission-enabled period. The transmission switch 44 connects the 20-MHz-band transmission physical layer section 42 and the RF section 10 together for a 20-MHz-band transmission-enabled period. This allows a reception frame to be transmitted from the RF section 10 to the physical layer sections 41 and 42.

Figure 6:
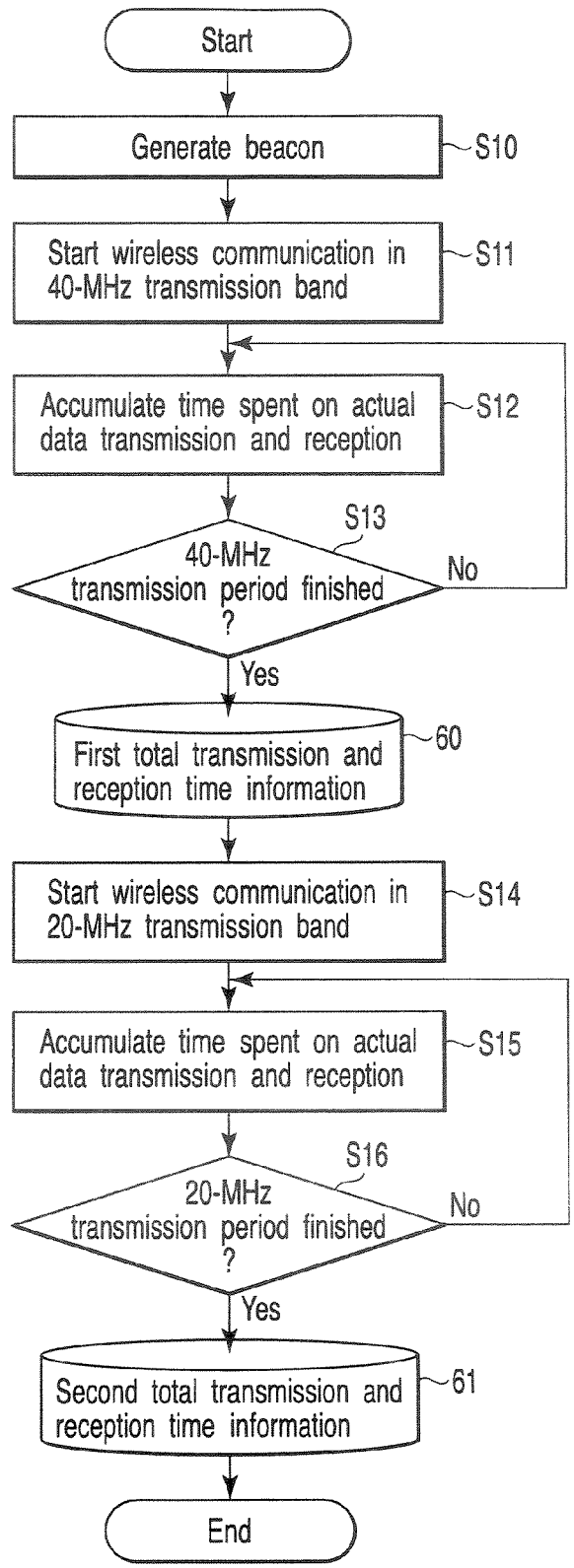
FIG. 6 is a flowchart of a method for measuring transmission and reception time which method is executed by the wireless LAN base station in accordance with the first embodiment of the present invention.
Figure 7:
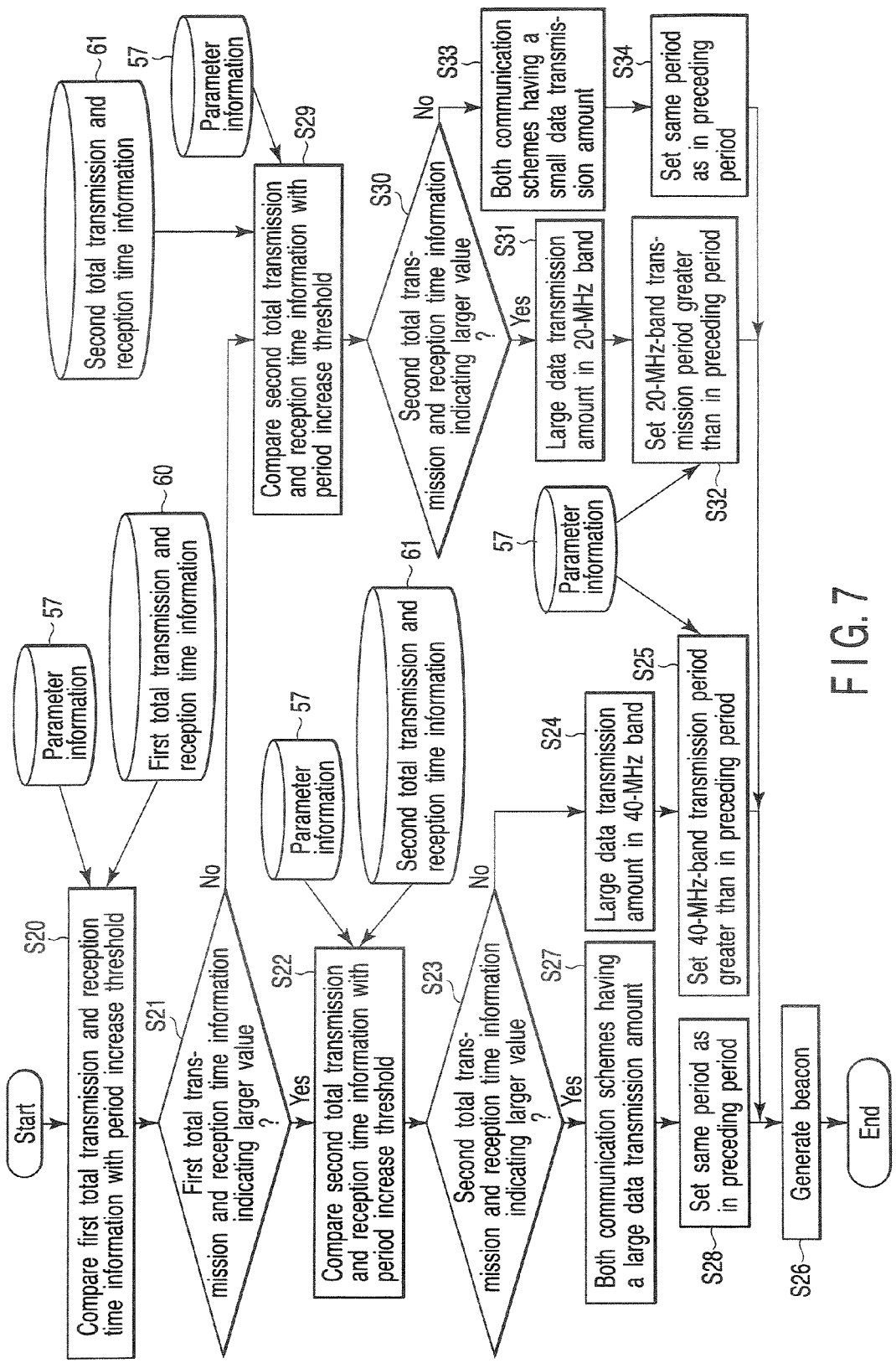
FIG. 7 is a flowchart of a method for determining transmission-enabled time which method is executed by the wireless LAN base station in accordance with the first embodiment of the present invention.

Now, with reference to FIGS. 6 to 8, description will be given of operation of the wireless LAN access point 2 configured as described above, focusing on a method for setting a transmission-enabled period for each communication scheme. FIG. 6 is a flowchart of operations of measuring sections 55 and 56. FIG. 7 is a flowchart for the transmission and reception period determining section 54. FIG. 8 is a timing chart for beacon frames, available communication schemes, the status of transmission and reception in the 40-MHz band, and the status of transmission and reception in the 20-MHz band.

First, at the time t0, a beacon frame is output by the wireless LAN access point 2 (step S10). It is assumed that at the time t0, the beacon frame contains transmission permission information and transmission inhibition information indicating that the 40-MHz-band transmission-enabled period is Δt40-1.

Then, in response to the beacon frame output at the time t0, the system 1 permits wireless communication using the 40-MHz transmission band. That is, the wireless LAN station 3 is enabled to communicate (step S11). The 40-MHz-band transmission and reception time measuring section 55 of the wireless LAN access point 2 starts to accumulate the amount of time spent on actual transmissions and receptions immediately after the wireless communication in the 40-MHz band has been permitted (step S12). In FIG. 8, shaded parts in the "40-MHz-band transmission and reception status" indicate time zones for actual transmissions and receptions. The 40-MHz-band transmission and reception time measuring section 55 accumulates the time (step S12) until the period Δt40-1 is over (step S13).

Once the period Δ40-1 is over (step S13), the total time is obtained which was required for transmissions and receptions in the 40-MHz band during the wireless communication period. This time is hereinafter referred to as first total transmission and reception time information 60. The first total transmission and reception time information 60 is provided to the transmission and reception period determining section 54.

Further, once the period Δt40-1 is over, the system 1 then permits wireless communication using the 20-MHz band. That is, the wireless LAN station 4 is enabled to communicate (step S14). The 20-MHz-band transmission and reception time measuring section 56 of the wireless LAN access point 2 starts to accumulate the amount of time spent on actual transmissions and receptions immediately after the wireless communication in the 20-MHz band has been permitted (step S15). In FIG. 8, shaded parts in the "20-MHz-band transmission and reception status" indicate time zones for actual transmissions and receptions. The 20-MHz-band transmission and reception time measuring section 56 accumulates the time (step S15) until the period Δt20-1 is over, that is, until the wireless communication period is over (step S16).

Once the period Δ20-1 is over, that is, the wireless communication period is over (step S16), the total time is obtained which was required for transmissions and receptions in the 20-MHz band during the wireless communication period. This time is hereinafter referred to as second total transmission and reception time information 61. The second total transmission and reception time information 61 is provided to the transmission and reception period determining section 54.

Then, the transmission and reception period determining section 54 compares the first total transmission and reception time information 60 with the period increase threshold in the parameter information 57. For example, the period increase threshold is assumed to be 80% of the transmission-enabled period as shown in FIG. 4. The transmission and reception period determining section 54 then determines whether or not the value for the first total transmission and reception time information 60 exceeds 80% of the 40-MHz-band transmission-enabled period (step S20 in FIG. 7). That is, the transmission and reception period determining section 54 determines whether or not the total time required for actual frame transmission and receptions based on the first communication scheme exceeds 80% of the period Δt 40-1.

FIG. 8 shows that the total time exceeds 80% of the period Δt 40-1 in step S21. If the transmission and reception period determining section 54 determines in step S20 that the total time exceeds 80% of the period Δt 40-1 (step S21, YES), it compares the second total transmission and reception time information 61 with the period increase threshold in the parameter information 57. That is, the transmission and reception period determining section 54 then determines whether or not the value for the second total transmission and reception time information 61 exceeds 80% of the 20-MHz-band transmission-enabled period (step S22). In other words, the transmission and reception period determining section 54 determines whether or not the total time required for actual frame transmission and receptions based on the second communication scheme exceeds 80% of the period Δt 20-1.

FIG. 8 shows the case where the transmission and reception period determining section 54 determines in step S23 that the total time does not exceed 80% of the period Δt 20-1 (step S23, NO). If the transmission and reception period determining section 54 determines in step S23 that the total time does not exceed 80% of the period Δt 20-1 (step S23, NO), it further determines that a large amount of data is communicated using the 40-MHz band, whereas a small amount of data is communicated using the 20-MHz band (step S24). The transmission and reception period determining section 54 sets the 40-MHz-band transmission-enabled period within the next wireless communication period starting at the time t1 longer than the 40-MHz-band transmission-enabled period within the wireless communication period starting at the time t0 (step S25). At this time, the transmission and reception period determining section 54 references the parameter information 57 to increase the 40-MHz-band transmission-enabled period by the time corresponding to the period increase rate. In the example in FIG. 4, the period increase rate is 120% of the transmission-enabled period. Accordingly, the transmission and reception period determining section 54 sets the 40-MHz-band transmission-enabled period Δt40-2 within the next wireless communication period starting at the time t1 1.2 times as long as the 40-MHz-band transmission-enabled period Δt40-1 within the wireless communication period starting at the time t0. The time by which the period Δt40-1 is increased is shown as a period Δt120 in FIG. 8. In this case, the period Δt40-2 should not exceed the maximum 40-MHz transmission period in the parameter information 57. That is, in the example in FIG. 4, the period Δt40-2 is set not to exceed 95% of the wireless communication period starting at the time t1.

Determining the period Δt40-2 as described above allows the relevant information to be provided to the beacon generating section 53. The beacon generating section 53 adds the period Δt40-2 to a beacon signal as transmission permission information and transmission inhibition information. On the basis of the information, the transmission processing section 51 generates a beacon frame at the time t1 (step S26).

If the transmission and reception period determining section 54 determines in step S23 that the total time exceeds 80% of the period Δt 20-1 (step S23, YES), it further determines that a large amount of data is communicated for both the 40-MHz band and the 20-MHz band (step S27). Accordingly, the transmission and reception period determining section 54 sets the 40-MHz-band transmission-enabled period Δt40-2 within the next wireless communication period starting at the time t1 equal to the 40-MHz-band transmission-enabled period within the wireless communication period starting at the time to (step S28). As a result, the 20-MHz-band transmission-enabled period Δt20-2 is equal to that in the wireless communication period starting at the time t0. Determining the period Δt40-2 as described above allows the relevant information to be provided to the beacon generating section 53. The process then proceeds to step S26.

If the transmission and reception period determining section 54 determines in step S21 that the total time does not exceed 80% of the period Δt 40-1 (step S21, NO), it compares the second total transmission and reception time information 61 with the period increase threshold in the parameter information 57. That is, the transmission and reception period determining section 54 determines whether or not the value for the second total transmission and reception time information 61 exceeds 80% of the 20-MHz-band transmission-enabled period (step S29). This processing is the same as that in step S22, described above.

If the transmission and reception period determining section 54 determines in step S29 that the total time exceeds 80% of the period Δt 20-1 (step S30, YES), it further determines that a large amount of data is communicated using the 20-MHz band, whereas a small amount of data is communicated using the 40-MHz band (step S31). The transmission and reception period determining section 54 sets the 20-MHz-band transmission-enabled period within the next wireless communication period starting at the time t1 longer than the 20-MHz-band transmission-enabled period within the wireless communication period starting at the time t0 (step S32). At this time, the transmission and reception period determining section 54 references the parameter information 57 to increase the 20-MHz-band transmission-enabled period by the time corresponding to the period increase rate. In the example in FIG. 4, the period increase rate is 120% of the transmission-enabled period. Accordingly, the transmission and reception period determining section 54 sets the 20-MHz-band transmission-enabled period Δt20-2 within the next wireless communication period starting at the time t1 1.2 times as long as the 20-MHz-band transmission-enabled period Δt20-1 within the wireless communication period starting at the time t0. The remaining time corresponds to the period Δt40-2. In this case, the period Δt40-2 should not be shorter than the minimum 40-MHz transmission period in the parameter information 57. That is, in the example in FIG. 4, the period Δt20-2 is set so that the period Δt40-2 is not shorter than 5% of the wireless communication period starting at the time t1. Determining the period Δt40-2 as described above allows the relevant information to be provided to the beacon generating section 53.

If the transmission and reception period determining section 54 determines in step S29 that the total time does not exceed 80% of the period Δt 20-1 (step S30, NO), it further determines that a small amount of data is communicated for both the 40-MHz band and the 20-MHz band (step S23). Accordingly, the transmission and reception period determining section 54 sets the 40-MHz-band transmission-enabled period Δt40-2 within the next wireless communication period starting at the time t1 equal to the 40-MHz-band transmission-enabled period within the wireless communication period starting at the time t0 (step S34). This processing is the same as that in step S28, described above.

As described above, the wireless LAN access point 2 controls the transmission and reception periods of the wireless LAN stations 3 and 4 in the system 1.

Figure 9:
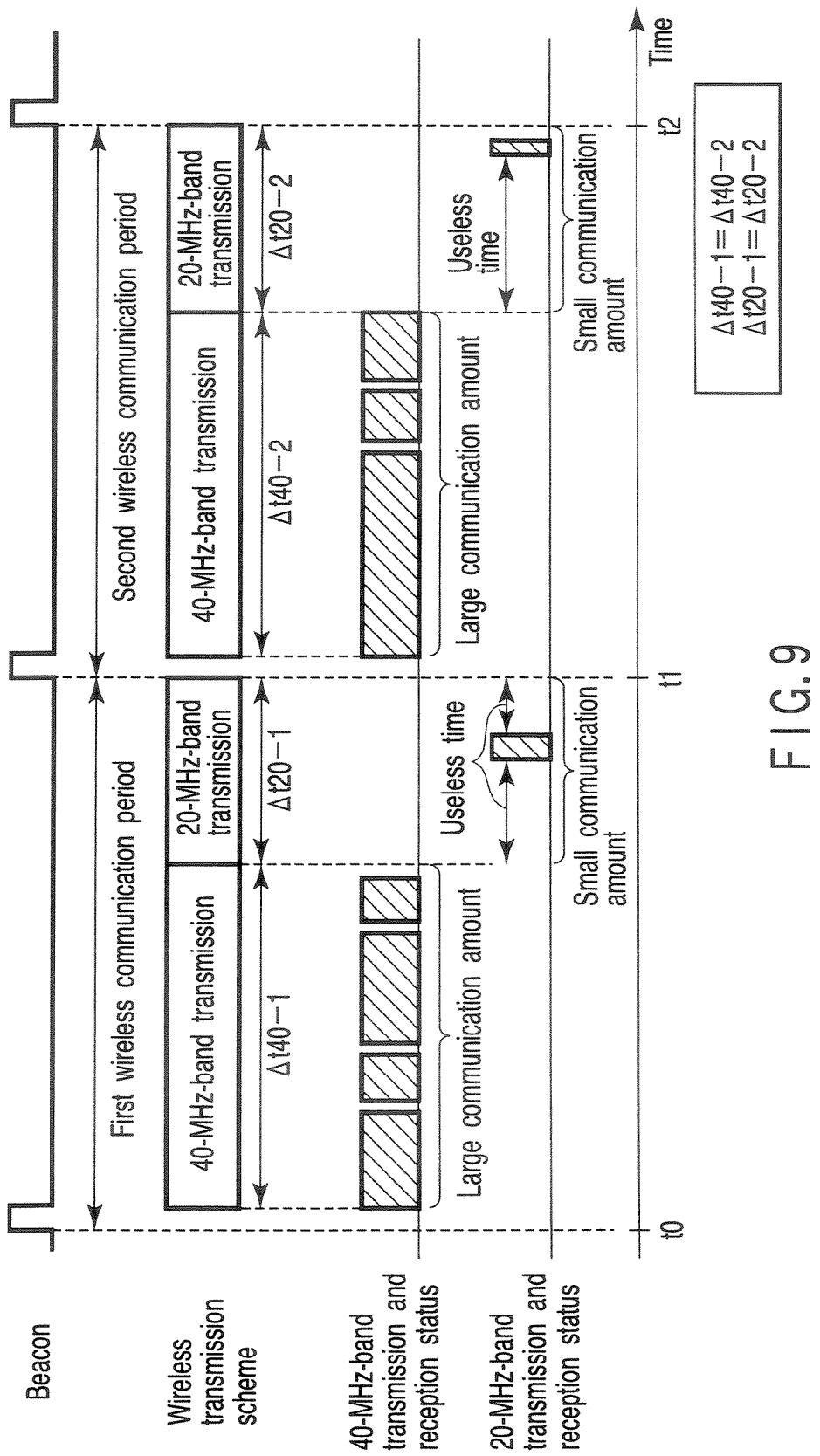
FIG. 9 is a timing chart for beacon frames, available communication schemes, the status of transmission and reception in the 40-MHz band, and the status of transmission and reception in the 20-MHz band in a wireless communication system.

As described above, the configuration in accordance with the first embodiment of the present invention determines the assignment of a communication period to each communication scheme for the next period on the basis of the amount of data transmitted and received during the current period using the communication scheme. That is, the dependence of the communication period for each communication scheme on traffic on the wireless LAN enables the provision of a wireless communication access point device and a wireless communication system which can improve the efficiency of data transmission. This effect will be described in comparison with the case where each communication schemes has the same communication time during each period. FIG. 9 is a timing chart for beacon frames, available communication schemes, the status of transmission and reception in the 40-MHz band, and the status of transmission and reception in the 20-MHz band, in a system in which a wireless LAN access point that can use the two communication schemes for the 40-MHz band and 20-MHz band, respectively, determines the communication period for each communication scheme.

As shown in the figure, a beacon frame is generated at each of the times t0 and t1 to start a wireless communication period. For simplification, the wireless communication periods are called a first wireless communication period and a second wireless communication period. The wireless LAN access point sets the 40-MHz-band transmission-enabled period and the 20-MHz-band transmission-enabled period at fixed values so that they do not vary between the first and second wireless communication periods. That is, Δt40-1=Δt40-2 and Δt20-1=Δt20-2. Here, it is assumed that the communication amount is large in the 40-MHz band and small in the 20-MHz band as shown in FIG. 9. Then, even though the transmission-enabled period is insufficient in the 40-MHz band, the 20-MHz-band transmission-enabled period is longer than the actual transmission period, resulting in a useless time during which no transmission or reception is performed. That is, the actual traffic on the wireless LAN is not equal to the transmission-enabled period for each wireless communication scheme, reducing the efficiency of data transmission.

As opposed to this, the present embodiment determines the transmission-enabled period for each wireless communication scheme during the next wireless communication period on the basis of the time required for data transmissions and receptions based on the wireless communication scheme during the current wireless communication period as described with reference to FIG. 8. For example, in FIG. 8, the wireless communication periods starting at the times t0 and t1 are called a first wireless communication period and a second wireless communication period. Then, if the value of the period of data transmissions and receptions only in the 40-MHz band during the first wireless communication period is larger than a given threshold, that is, if a large amount of data is communicated, then the transmission-enabled period with the 40-MHz band during the second wireless communication period is increased. In contrast, if the value of the period of data transmissions and receptions only in the 20-MHz band during the first wireless communication period is larger than a given threshold, then the transmission-enabled period with the 20-MHz band during the second wireless communication period is increased. That is, the current traffic on the wireless LAN is monitored so that the transmission-enabled period for a communication scheme with a large data communication amount can be increased. This enables a reduction in a useless time during communication based on a wireless communication scheme with a small data communication amount. Data can thus be efficiently transmitted.

Further, the present embodiment holds the maximum and minimum values of the transmission-enabled time with the 40-MHz band as parameter information 57. This makes it possible to prevent the transmission-enabled period based on one of the wireless communication schemes from being zeroed.

Second Embodiment

Now, description will be given of a wireless communication access point and a wireless communication system in accordance with a second embodiment of the present invention. The present embodiment relates to an example in which in the above first embodiment, a data frame requests an acknowledge frame. The configurations of the wireless communication system and wireless LAN access point in accordance with the present embodiment are similar to those in the first embodiment. Only the difference from the first embodiment will be described below. FIG. 10 is a block diagram of a partial area of the wireless communication system 1 in accordance with the present embodiment, a schematic diagram showing the communication between the wireless LAN access point 2 and the wireless LAN station 3.

As shown in FIG. 10, the wireless LAN station 3 transmits a data frame to the wireless LAN access point 2. Upon receiving the data frame, the wireless LAN access point 2 transmits an acknowledge (ACK) frame to the wireless LAN station 3. Wireless LAN stations conforming to IEEE 802.11e can use an Ack Policy field in an MAC header section to select whether or not to allow the receiver to return an acknowledge frame. The present embodiment relates to a method for measuring the transmission and reception time when such a data frame is handled.

FIG. 11 is a timing chart showing the transmission and reception status of the wireless LAN access point 2, the transmission and reception status of the wireless LAN station 3, and the time measured by the measuring section 55. FIG. 11 shows the case where a data frame does not expect an acknowledge frame to be returned (CASE1) and the case where the data frame expects an acknowledge frame to be returned (CASE2). This also applies to the case where the measuring section 56 is used for measurement.

First, CASE1 will be described. As shown in FIG. 11, it is assumed that the wireless LAN access point 2 starts to transmit a data frame at a time t10 and finishes the transmission at a time t11. The transmission processing section 51 recognizes, from the MAC header added to the packet, that the data frame does not expect an acknowledge frame to be returned. The transmission processing section 51 thus outputs the corresponding information to the measuring section 55. The measuring section 55 thus recognizes that the data frame does not expect an acknowledge frame to be returned, and measures the time (time t10 to time t11) required to transmit the data frame as a transmission and reception time. This also applies to the case where the wireless LAN station 3 transmits a data frame. In this case, in the wireless LAN access point 2, the reception processing section 52 reads the MAC header added to the received data frame. At this time, the reception processing section 52 recognizes that the data frame does not expect an acknowledge frame to be returned.

Now, CASE2 will be described. As shown in FIG. 11, it is assumed that the wireless LAN station 3 starts to transmit a data frame at a time t12 and finishes the transmission at a time t13. It is further assumed that in response to this, the wireless LAN access point 2 starts to transmit an acknowledge frame at a time t14 and finishes the transmission at a time t15. First, the measuring section 55 starts measurement at the time t12.

At the same time, the reception processing section 52 reads the MAC header of the received data frame to notice the measuring section 55 that the data frame expects an acknowledge frame to be returned. Then, the measuring section 55 does not stop measurement until the time t13, when the transmission of the data frame is completed, and continuously makes measurement until the time t15, when the transmission of an acknowledge frame is completed. That is, the measuring section 55 calculates the transmission and reception time by summing the time required to receive the data frame (time t12 to time t13), the time required to transmit the acknowledge frame (time t14 to time t15), and the time from the completion of reception of the data frame until the start of transmission of the acknowledge frame (time t13 to time t14). This also applies to the case where a data frame is returned by the wireless LAN access point 2.

The above method enables the wireless LAN access point 2 to deal with both the case where a data frame expects an acknowledge frame to be returned and the case where the data frame does not expect an acknowledge frame to be returned.

Third Embodiment

Now, description will be given of a wireless communication access point device and a wireless communication system in accordance with a third embodiment of the present invention. The present embodiment corresponds to the first and second embodiments in which the wireless communication period is changed. The remaining parts of the configuration and method are as described in the first and second embodiments. FIG. 12 is a timing chart for beacon frames, available communication schemes, the status of transmission and reception in the 40-MHz band, and the status of transmission and reception in the 20-MHz band.

As shown in FIG. 12, in the wireless LAN access point 2 in accordance with the present embodiment, two periods of a beacon frame constitute one wireless communication period. For example, a wireless communication period starting at a time t0 is from the time t0 to a time t1 when a second beacon frame is generated. With the present configuration, the processing executed by the measuring sections 55 and 56 corresponds to the processing shown in the flowchart in FIG. 6 in which step S10 is replaced with a step of "recognizing the start of a wireless communication period". Since the time to start a wireless communication period is determined by the wireless LAN access point 2, the wireless LAN access point 2 obviously recognizes this time regardless of a timing for beacon generation.

As described above, in the first and second embodiments, the interval between wireless communication periods may be an integral multiple of that between beacon frames.

As described above, in a wireless LAN using a plurality of wireless communication schemes, the wireless communication access point devices and wireless communication systems in accordance with the first to third embodiments of the present invention measure the time required for communication based on each wireless communication scheme, that is, the communication amount. If any wireless communication scheme has required a communication time longer than that indicated by a given threshold, the period during the next communication cycle in which that wireless communication scheme is permitted to communicate is set longer than in the current cycle. In other words, the period during which a wireless communication scheme with a small communication amount is permitted to communicate is reduced, and the corresponding communication period is assigned to a wireless communication scheme with a large communication amount. This enables the assignment of communication periods to the respective wireless communication schemes which is compatible with the traffic on the wireless LAN. This in turn allows data to be efficiently transmitted.

The parameter information 57 in FIG. 4, described in the above embodiments, is only illustrative and each set value can be determined depending on the status of the wireless LAN. For example, in some cases, if the transmission-enabled period for one of the communication schemes can be zeroed without any problem, it is not necessary to set the maximum or minimum period. Further, in FIG. 4 for the above embodiments, the maximum and minimum periods are set only for the 40-MHz communication scheme. However, of course, they may be set for the 20-MHz communication scheme or for both communication schemes. Furthermore, in the description of the above embodiments, the transmission-enabled period for a communication scheme with a long transmission and reception time is increased. However, the same effect can be exerted by reducing the transmission-enabled period for a communication scheme with a short transmission and reception time. In this case, as the parameter information 57, a period decrease rate may be set in place of the period increase rate. A period decrease threshold may be set in place of the period increase threshold.

Alternatively, the increase rate or decrease rate and the threshold may change when the transmission-enabled period has at least or at most a given value. That is, a plurality of values are set for each of the period increase rate, period decrease rate, period increase threshold, and period decrease threshold. One of these set values is used in accordance with the transmission-enabled period.

Moreover, in the description of the above embodiments, the wireless LAN system uses the two communication schemes by way of example, and the communication schemes have transmission bands of 40 MHz and 20 MHz. However, the transmission bands are not limited to 40 MHz and 20 MHz, and the present embodiments are applicable to a wireless LAN system with a mixture of at least three communication schemes.

Figure 13:
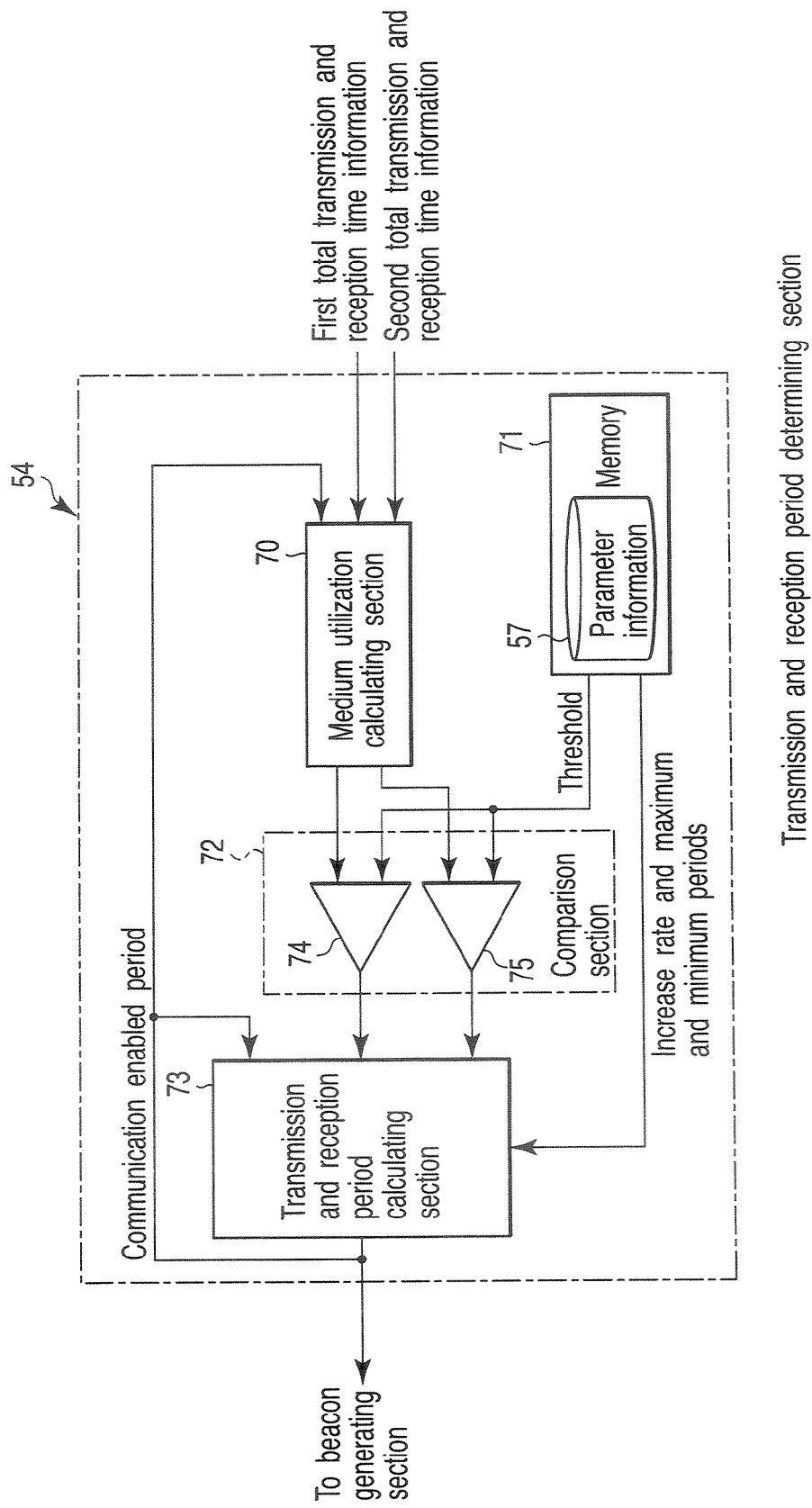
FIG. 13 is a circuit diagram of a transmission and reception time determining section in accordance with a variation of the first to third embodiments of the present invention.

Further, the transmission and reception period determining section 54 may be realized by software executing the process shown in FIG. 7 using CPU or the like. However, the transmission and reception period determining section 54 may be realized by hardware such as that shown in FIG. 13. FIG. 13 is a block diagram of the transmission and reception period determining section 54. The transmission and reception period determining section 54 includes a medium utilization calculating section 70, a memory 71, a comparison section 72, and a transmission and reception period determining section 73. The medium utilization calculating section 70 receives first and second total transmission and communication-enabled periods, and calculates a proportion of the transmission and reception time to the transmission-enabled period for each wireless communication scheme. The memory 71 holds parameter information 71. The comparison section 72 includes comparison circuits 74 and 75. The comparison circuits 74 and 75 compare the calculation result provided by the medium utilization calculating section 70 with the period increase threshold. The transmission and reception period calculating section 73 calculates a communication-enabled period using the comparison result provided by the comparison section 72, the communication-enabled period during the preceding cycle, and the set values in the parameter information 57. The above configuration can executed the process shown in FIG. 7.

Furthermore, in the description of the above embodiments, the transmission and reception time measuring section 58 includes the two blocks, the measuring sections 55 and 56.

However, the transmission and reception time measuring section 58 can use the same measuring logic and the same routine (the process shown in FIG. 6) to measure the amounts of time spent on transmissions and receptions in the 40-MHz band and in the 20-MHz band. The transmission and reception times are saved to a memory (not shown) for management. This does not mean that such circuits as described above are present for the measuring sections 55 and 56 but that the transmission and reception time measuring section 58 has such functions.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A wireless communication base station device configured to use a first wireless communication scheme and a second wireless communication scheme which use overlapping bands, the device comprising:
a measuring section which measures a first transmission and reception time spent on actual data transmission and reception during a first communication-enabled period in which data communication based on the first wireless communication scheme is permitted, and measures a second transmission and reception time spent on actual data transmission and reception during a second communication-enabled period in which data communication based on the second wireless communication scheme is permitted; and
a communication period determining section which determines lengths of the first and second communication-enabled periods in accordance with the first and second transmission and reception times measured by the measuring section,
wherein if transmitted and received data requests an acknowledge signal for the data, the measuring section calculates the first and second transmission and reception times by summing time required to transmit the data, time required to transmit and receive the acknowledge signal, and time from completion of transmission and reception of the data until start of transmission and reception of the acknowledge signal, and
if the transmitted and received data does not request an acknowledge signal for the data, the measuring section calculates each of the first and second transmission and reception times to be equal to the time required to transmit and receive the data.

2. The device according to claim 1, wherein the data is transmitted by repeating a communication cycle containing the first communication-enabled period and second communication-enabled period the lengths of which have been determined by the communication period determining section,
the communication period determining section holds a threshold for determining the lengths of the first and second communication-enabled periods, and
if of the proportion of the first transmission and reception time to the first communication-enabled period and the proportion of the second transmission and reception time to the second communication-enabled period, only the proportion of the first transmission and reception time to the first communication-enabled period exceeds the threshold, the communication period determining section increases the first communication-enabled period during a next communication cycle, and if only the proportion of the second transmission and reception time to the second communication-enabled period exceeds the threshold, the communication period determining section increases the second communication-enabled period during the next communication cycle.

3. The device according to claim 1, wherein the first wireless communication scheme uses a frequency bandwidth of 40 MHz, and the second wireless communication scheme uses a frequency bandwidth of 20 MHz.

4. The device according to claim 2, wherein the first wireless communication scheme uses a frequency bandwidth of 40 MHz, and the second wireless communication scheme uses a frequency bandwidth of 20 MHz.

5. The device according to claim 2, wherein the communication period determining section includes a table holding the threshold, an increase rate at which each of the first and second communication periods is increased, and a maximum value and a minimum value of one of the first and second communication-enabled periods, and one of the first and second communication-enabled periods is set at a value equal to or smaller than the maximum value and equal to or larger the minimum value.

6. The device according to claim 2, wherein the first wireless communication scheme uses a frequency bandwidth of 40 MHz, and the second wireless communication scheme uses a frequency bandwidth of 20 MHz.

7. The device according to claim 1, wherein the first wireless communication scheme uses a frequency bandwidth of 40 MHz, and the second wireless communication scheme uses a frequency bandwidth of 20 MHz.

8. The device according to claim 1, further comprising a beacon generating section which generates a beacon provided with the first communication-enabled period; and a transmission section configured to create a beacon frame on the basis of the beacon and to transmit the beacon frame to a wireless communication terminal, wherein the wireless communication terminal performs the transmission and reception the data in synchronism with the beacon frame.

9. A wireless communication system comprising:

a wireless communication base station device configured to use a first wireless communication scheme and a second wireless communication scheme which use overlapping bands, the wireless communication base station device including:

a measuring section which measures a first transmission and reception time spent on actual data transmission and reception during a first communication-enabled period in which data communication based on the first wireless communication scheme is permitted, and measures a second transmission and reception time spent on actual data transmission and reception during a second communication-enabled period in which data communication based on the second wireless communication scheme is permitted;

a communication period determining section which determines lengths of the first and second communication-enabled periods in accordance with the first and second transmission and reception times measured by the measuring section;

a beacon generating section which generates a beacon provided with the first communication-enabled period determined by the communication period determining section; and a transmission section configured to create a beacon frame on the basis of the beacon and to transmit the beacon frame;

a plurality of first wireless communication terminals which use the first wireless communication scheme to transmit and receive data to and from the wireless communication base station device; and a plurality of second wireless communication terminals which use the second wireless communication scheme to transmit and receive data to and from the wireless communication base station device, wherein if transmitted and received data requests an acknowledge signal for the data, the measuring section calculates the first and second transmission and reception times by summing time required to transmit the data, time required to transmit and receive the acknowledge signal, and time from completion of transmission and reception of the data until start of transmission and reception of the acknowledge signal, and if the transmitted and received data does not request an acknowledge signal for the data, the measuring section calculates each of the first and second transmission and reception times to be equal to the time required to transmit and receive the data.

10. The system according to claim 9, wherein the first wireless communication terminal performs the transmission and reception in synchronism with the beacon frame transmitted by the wireless communication base station device and is communicable during the first communication-enabled period provided in the beacon frame, and the second wireless communication terminal performs the transmission and reception in synchronism with the beacon frame transmitted by the wireless communication base station device and is inhibited from communicating during the first communication-enabled period provided in the beacon frame.

* * * * *